J. NEFF.
Tree-Protectors.

No. 145,585.

Patented Dec. 16, 1873.

Witnesses,
J. S. Brown,
E. M. Gallaher.

Inventor,
Jonathan Neff

UNITED STATES PATENT OFFICE.

JONATHAN NEFF, OF DALLASTOWN, PENNSYLVANIA.

IMPROVEMENT IN TREE-PROTECTORS.

Specification forming part of Letters Patent No. 145,585, dated December 16, 1873; application filed December 5, 1873.

*To all whom it may concern:*

Be it known that I, JONATHAN NEFF, of Dallastown, in the county of York and State of Pennsylvania, have invented an Improved Tree-Protector; and I do hereby declare that the following is a full and exact description thereof, reference being had to the accompanying drawings, making part of this specification—

Figure 1:
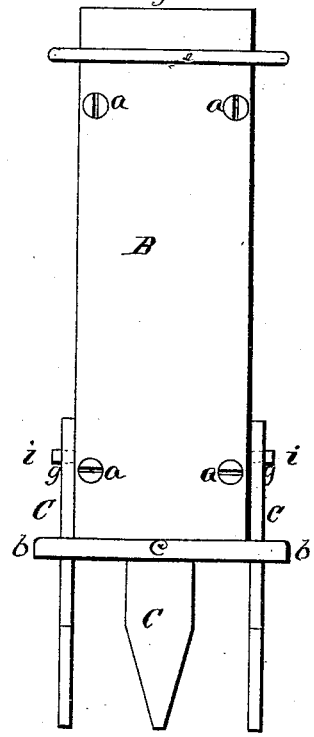
Figure 2:
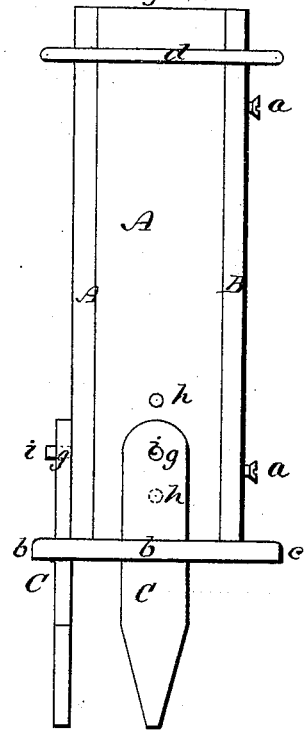
Figure 3:
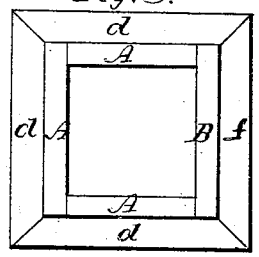
Figure 4:
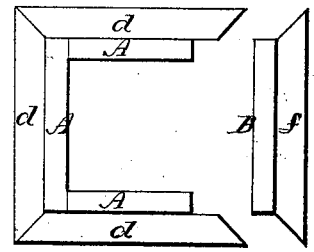

Figure 1 being a front view of my improved tree-protector; Fig. 2, a side view of the same; Fig. 3, a top view thereof; Fig. 4, a top view of the same with the removable side detached.

Like letters designate corresponding parts in all of the figures.

The object of my invention is especially to protect peach, plum, apple, and other fruit-trees from the ravages of the borer; and my device is founded on the observation of the habits of the grub and of the beetle that produces it.

By much observation I have learned that the beetle that produces the borer, and which flies about in August and the autumnal months, and deposits its eggs in crevices and depressions in the trunks of the fruit-trees, has this peculiarity of habit, that it flies swiftly and low, seldom more than a foot and a half above the surface of the ground, so that if the tree is protected to the height of about three feet from the ground with a close surrounding case the tree is effectually shielded from the incursions of the insect. But, although it is not difficult to find such a protector for the tree, it is not so easy to devise one that is in all respects practicable, for it must not only be tight and fully answer the purpose of excluding the insects from the lower part of the tree-body, but it must be cheap of construction, so that fruit-raisers can afford to protect all of their fruit-trees thereby, and also be so constructed and of such materials that it can be made in any locality and with means ordinarily at hand in any place.

The following construction is that which I have found to fulfill the purpose in every respect, and to adapt the device to the protection of the trees, not only from the ravages of the borer, but from other pests, the gnawing of goats, mice, and other animals, and to protect the trees from sun-scald and the severe cold of the winter season.

I make a square box of four strips of boards, three sides, A A A, being nailed closely together, and the fourth side, B, being attached to the adjacent sides by screws *a a a a*, four screws ordinarily answering the purpose, so that the said side may be readily detached at any time to remove the box from the tree, and as readily be reattached, the means being of the cheapest and simplest kind to answer the purpose conveniently. The height of the sides may be three feet, more or less, or may ordinarily reach to within a few inches of the first limbs of the tree; and the width of the box may vary, there being preferably different sizes, some of sufficient size only to inclose the bodies of very young trees, and others of larger sizes, to suit the trees at different periods, as they grow larger, the different sizes of boxes being intended to be successively applied to the trees as their bodies increase in diameter. I also attach cleats *b b b c* around the lower end of the box, one cleat, *c*, being attached to and removable with the removable side B; and there may be cleats *d d d f* around the top of the box, one cleat, *f*, also being attached to and removable with the removable side B, as shown in Fig. 4.

For the purpose of excluding the borer beetle during the latter summer and the autumnal months, the box is to rest close upon the ground, around the tree; but at other times it is desirable to ventilate more thoroughly around the tree, and for that purpose the box is to be raised above the ground a few inches.

To adapt the tree-box to all the uses indicated, I provide a means of adjusting the same either close to the ground or to one or more variations of height therefrom. I find the following device to be effectual and sufficiently convenient: Adjusting props or stakes C C C, readily made from strips of boards, pointed at their lower ends, are attached to the several fixed sides A A A of the box, it being generally most convenient to have none attached to the removable side B of the box. These props pass through notches or mortises in the cleats *b b b*, which help to hold the box to the props. In each prop C there is a hole, *g*, near the upper end thereof, and in each of the sides A A A of the box there is a series of holes, h h h, one above another, corresponding in position with the holes in the props. A pin, i, put through the hole g in each prop, and through one of the holes h h h in each side A of the box, holds the box at the height thus determined. The props are driven into the ground as attached to the box to such a depth that, when the pins i i i are put through the several upper holes of the series h h h of the box-sides, the box is held close to the ground; but when the pins are put through either set of the lower holes in the box-sides the box is correspondingly raised and held above the ground. When the box is adjusted close to the ground the props C C C cover the whole series of holes h h h, so that no beetles can crawl through them in that position. The props are readily drawn from the ground when the box is to be removed from the tree, or they may remain in place and different boxes be attached successively thereto, since the props readily slip from behind the cleats b b b by lifting the box. A bunch of straw or hay, packed loosely around the body of the tree in the upper open end of the box, serves to steady the top of the box in its position, and to exclude the entrance of insects and vermin thereby, without preventing ventilation around the tree-body.

What I claim as my invention, and desire to secure by Letters Patent, is—

A tree-protector constructed with fixed sides A A A, a removable side, B, and adjusting-props C C C, combined and operating together substantially as and for the purposes herein specified.

JONATHAN NEFF.

Witnesses:
  J. S. BROWN,
  E. M. GALLAHER.